United States Patent [19]

Rieger et al.

[11] Patent Number: 5,698,033
[45] Date of Patent: Dec. 16, 1997

[54] APPARATUS FOR THE PRODUCTION OF A MAGNETIC RECORDING MEDIUM

[75] Inventors: Siegfried Rieger, Gröbenzell; Reinhard Krätschmer, Landsberg; Franz-Xaver Wagner, München, all of Germany

[73] Assignee: BASF Magnetics GmbH, Ludwigshafen, Germany

[21] Appl. No.: 457,279

[22] Filed: Jun. 1, 1995

[30] Foreign Application Priority Data

Jun. 9, 1994 [DE] Germany .......... 44 20 103.6

[51] Int. Cl.⁶ .......... B05C 3/02
[52] U.S. Cl. .......... 118/411; 427/548
[58] Field of Search .......... 118/410, 411, 118/419; 427/548, 549

[56] References Cited

U.S. PATENT DOCUMENTS

| | | | |
|---|---|---|---|
| 2,761,791 | 9/1956 | Russell | 118/410 |
| 3,681,138 | 8/1972 | Ankenbrand et al. | |
| 3,928,679 | 12/1975 | Jackson et al. | 118/411 |
| 4,469,782 | 9/1984 | Ishiwata et al. | 118/411 |
| 4,883,691 | 11/1989 | McIntye | 118/410 |
| 5,099,786 | 3/1992 | Shibata et al. | 118/410 |
| 5,206,056 | 4/1993 | Shibata et al. | 118/410 |

FOREIGN PATENT DOCUMENTS 1029017  5/1966  United Kingdom .......... 118/411

*Primary Examiner*—Brenda A. Lamb
*Attorney, Agent, or Firm*—Keil & Weinkauf

[57] ABSTRACT

In an extrusion coater having at least two coating slots (8, 8'), the central line between the coating slots is arranged perpendicular to the plane of the substrate (1) and the terminating edge (15) of the separator (16) between the two coating slots is a downward-sloping surface. Opposite the extruder orifice and behind the substrate is the edge (5) of a magnet (2) which draws the magnetizable layers out of the coater outlet orifice (3), the edge (5) being arranged at the height of the common outlet orifice of the coating slots (8, 8'). By means of this arrangement, a uniform coating is achieved even in the case of very thin double layers and even at high coating speeds.

7 Claims, 4 Drawing Sheets

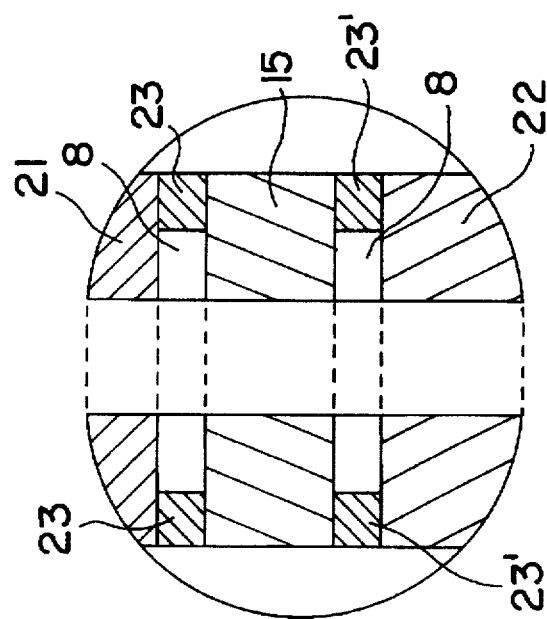
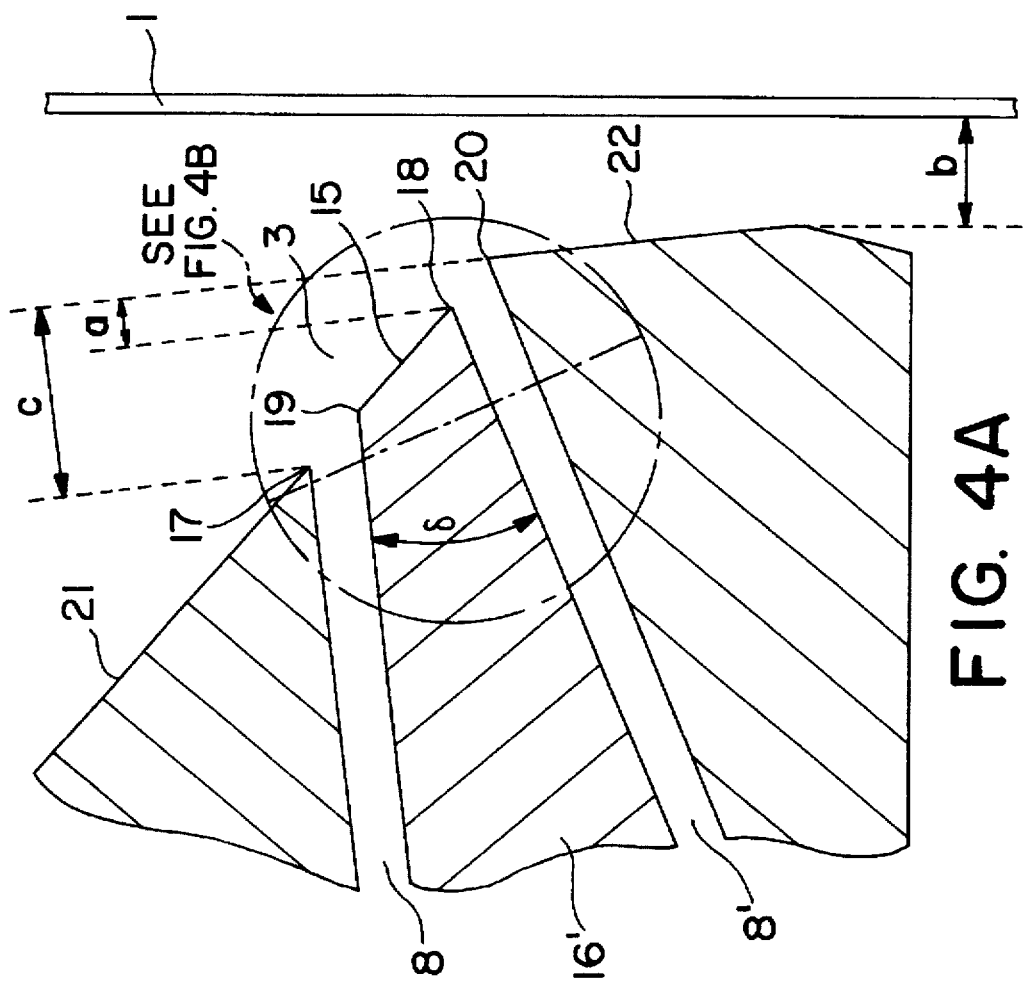
FIG. 4B
FIG. 4A

APPARATUS FOR THE PRODUCTION OF A MAGNETIC RECORDING MEDIUM

FIELD OF THE INVENTION

The present invention relates to an extrusion coater having at least two coating slots for applying one or more magnetizable layers, one on top of the other, on a flexible nonmagnetic substrate, the upper lip of the common outlet orifice of the coating slots being recessed relative to the lower lip, and a right parallelepiped magnet which is essentially parallel to the substrate and whose upper edge is a distance away from the extruder orifice is arranged behind the substrate.

BACKGROUND OF THE INVENTION

There are several methods for applying such magnetizable layers. A dispersion containing the magnetic pigments can be applied to the film by an immersion method, a knife coater, a reverse roll coater or an extrusion coater. The extrusion coater has the advantage of a closed backflow-free system which meets the necessary cleanliness requirements for the production of a modern high-performance magnetic tape.

Extrusion coaters for the simultaneous application of two layers one on top of the other were described in the Patents EP 0 392 810, DE 40 11 279 and U.S. Pat. No. 5,072,688. Here, two different dispersions flow one on top of the other within the coater block and emerge as an unmixed double layer from the extruder orifice directly onto the substrate moving freely past the extruder orifice. The layer fills the gap between substrate and coater orifice. The constancy of the wet layer thickness over web width and web length is controlled by the uniformity of metering and substrate movement. Owing to the system-related fluctuations in these properties, there may be deviations in the wet layer thickness of up to several µm, which is far too high for wet layer thicknesses of about 10 µm, which are required for modern magnetic tapes.

The abovementioned U.S. Pat. No. 5,072,688 discloses various shapes of the terminating edge (2a) of the separator (2) between the two coating slots (6, 7) for obtaining an optimum defect-free coat structure during double-layer coating.

An extrusion coater of the abovementioned generic type is disclosed in German Laid-Open Application DOS 4,226, 139 of the same Applicant. This arrangement avoids the disadvantages of the abovementioned prior art but has the following disadvantages (cf. FIG. 1 of the present Application):

The sharp edge of the wedge between the coating slots (8, 8') may become damaged by splintering during cleaning It has been found that, for example during production stoppages, there was a danger of deposits forming on the edges, which is known to lead to stripes in the coating when coating is continued.

SUMMARY OF THE INVENTION

It is an object of the present invention to provide an extrusion coater of the abovementioned generic type which does not have the stated disadvantages, in which there is furthermore no danger of mixing of the two part-layers after application to the substrate and in which a stripe-free coating is achievable even with minimum layer thicknesses.

We have found that this object is achieved, according to the invention, by an extrusion coater having at least two coating slots for applying one or more magnetizable layers, one on top of the other, on a flexible nonmagnetic substrate, the upper lip of the common outlet orifice of the coating slots being recessed relative to the lower lip, and a right parallelepiped magnet which is essentially parallel to the substrate and whose upper edge is opposite and a distance away from the extruder orifice is arranged behind the substrate, wherein the central line (14) between the coating slots (8, 8') is arranged perpendicular to the plane of the substrate (1) and the outlet-end terminating edge (15) of the separator (16') between the two coating slots is a surface falling off at an angle of from 10° to 60° to the plane of the substrate in the direction of the lower lip (12).

Furthermore, this object was achieved by an extrusion coater, wherein the two coating slots (8, 8') point upward at the outlet end in such a way that the angle ε between the perpendicular (14') to the plane of the substrate (1) and the upper coating slot (8) is at least 5° and the outlet-end terminating edge (15) of the separator (16') between the two coating slots is a surface falling off at an angle of from 110° to 60° to the plane of the substrate in the direction of the lower lip (12).

Further details of the invention are evident from the description, the drawings and the subclaims.

The invention is illustrated below with reference to the drawings and by means of an example of a double-layer coating comprising two magnetic layers, but without the invention being restricted thereto.

SHORT DESCRIPTION OF THE DRAWINGS

FIG. 4 shows an enlarged section of the extrusion coater according to FIG. 3.

PREFERRED EMBODIMENT OF THE INVENTION

Figure 1:
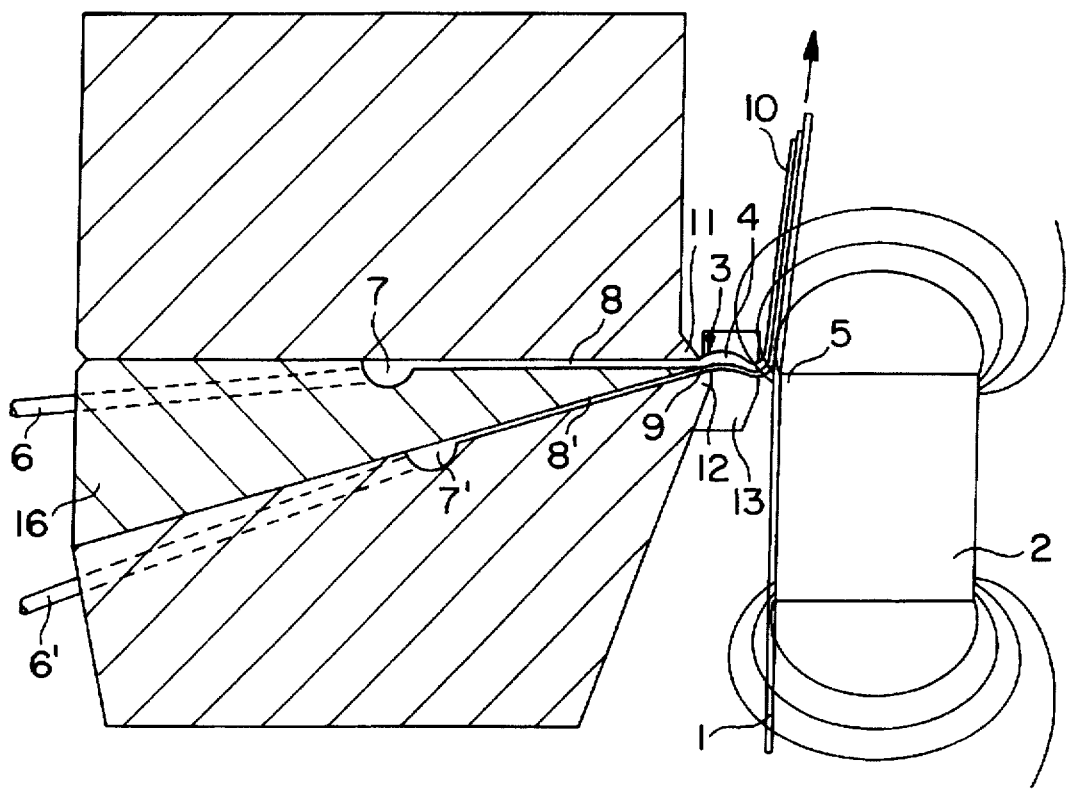
FIG. 1 shows a double-slot coater according to DE 42 26 139.
Figure 2:
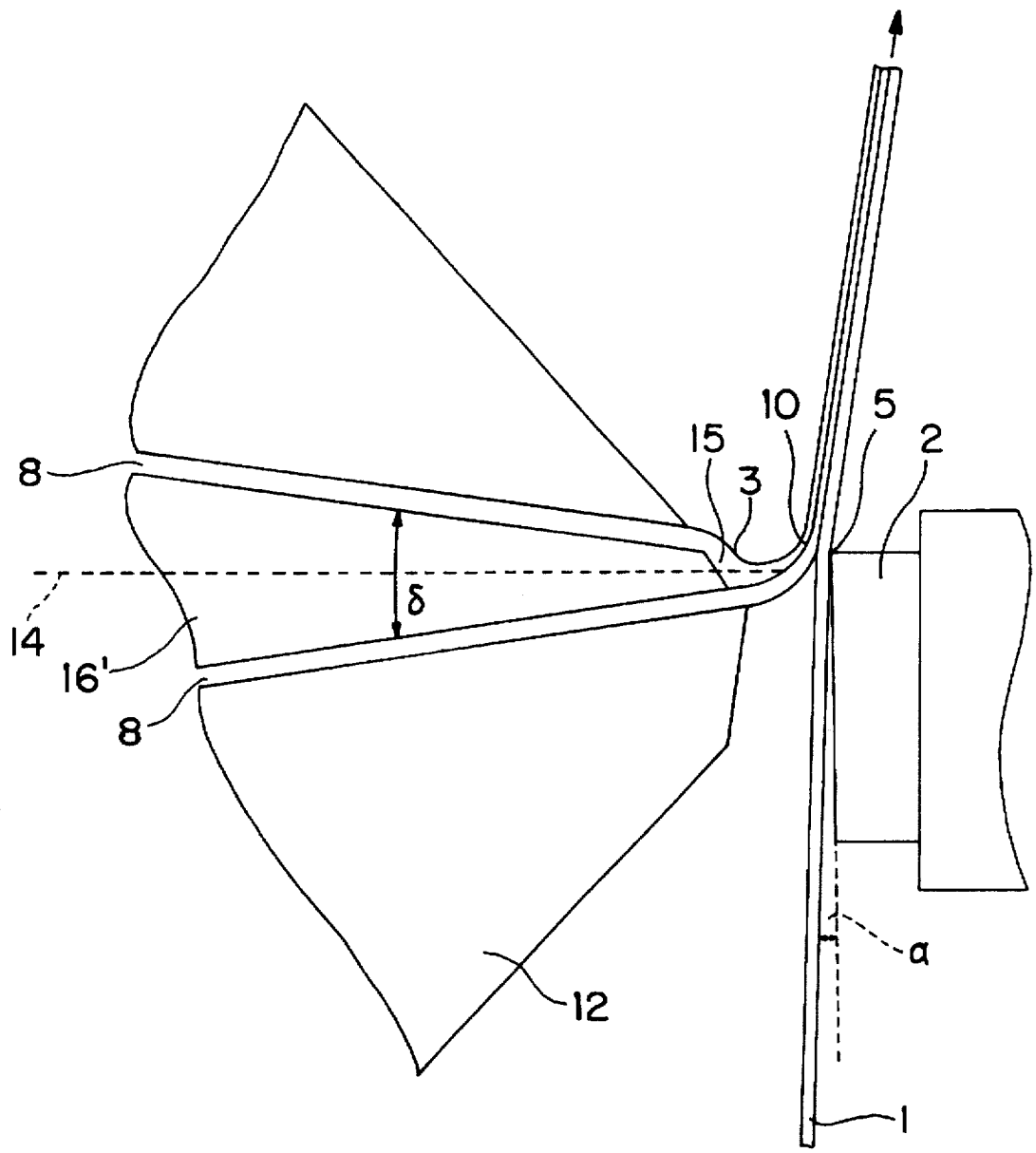
FIG. 2 shows a cross-section through the novel double-slot coater.

If the embodiments of the known extrusion coater according to FIG. 1 are compared with that of the novel extrusion coater according to FIG. 2, the modifications on which the invention is based and which achieve the objects stated at the outset are evident.

While the coating slots (8, 8') in the known extrusion coater are asymmetric with respect to the plane of the magnet (5) or of the substrate (1), the essential feature of the novel extrusion coater is that the central line (14) between the coating slots (8, 8') is arranged perpendicular to the plane of the substrate. A further essential feature is that the separator (16) between the two coating slots (8, 8') comes to a point at an acute angle at the common outlet orifice (3) in the known extrusion coater and, as already described above, cannot be cleaned without the risk of damage. In addition, this lip geometry effectively avoids the danger of drying on, in that the terminating edge (15) of the separator (16') between the two coating slots (8, 8') is a surface falling off at an angle of from 10° to 60°, preferably 30°, to the plane of the substrate in the direction of the lower lip (12). This surface (15) has a length of about 1 mm.

As is evident from FIG. 2 in comparison with FIG. 1, in the known extrusion coater the layer packet (10) emerging from the coating orifice (3) has a point of reversal in the direction of movement, and it has been found that this may give rise to coating problems, particularly at high coating velocities. On the other hand, in the novel extrusion coater constructed symmetrically with respect to the substrate plane, the layer packet (10') runs more softly, ie. in a uniformly curved line, and is applied uniformly to the substrate (1). It has been found that, by appropriate metering of the coating slots (8, 8'), it is possible to apply both part-layers individually to the substrate uniformly for test purposes.

A further difference is the horizontal distance of the upper lip from the projecting lower lip, which was of the order of magnitude of from 2 to 3 mm in the extrusion coater according to FIG. 1 whereas it could be reduced to a distance of from 1 to 2.2 mm in the novel extrusion coater, which likewise gives better coating behavior.

Figure 3:
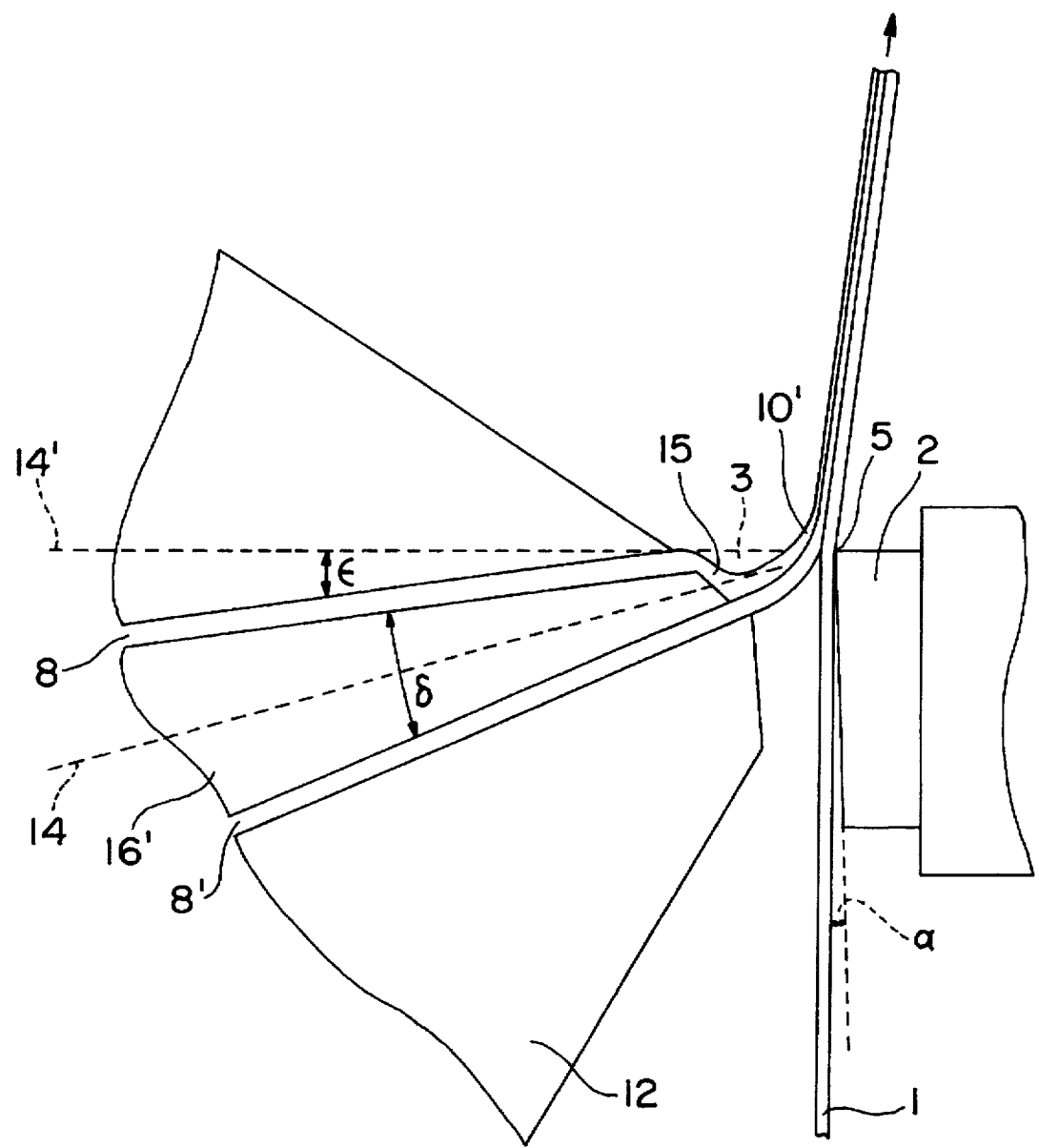
FIG. 3 shows a double-slot coater position which differs from that of FIG. 2

FIG. 3 shows an embodiment of the double extrusion coater, which embodiment is modified relative to FIG. 2. The two coating slots (8, 8') are inclined obliquely upward at the outlet end, the angle ε between the perpendicular (14') to the substrate (1) and the upper slot (8) being at least 5°. The angle δ between the coating slots is in the same range as in the embodiment according to FIG. 2.

Particularly when coating is interrupted, the modified embodiment avoids the danger of dispersion running out, and the danger of drying on in the outflow region is thus effectively avoided.

The details of the coater design are more readily evident from FIG. 4. The upper edges of the upper and of the lower coating slot (17, 18) have the form of a surface the length of which measuring about 50 μm. The respective lower edges (19, 20), too, may be correspondingly formed. The angle δ between the coating slots (8, 8') is of the order of magnitude of from 10° to 45°, advantageously 15° to 45°, preferably 25°. The width of the coating slots (8, 8') can be varied from 0.1 to 1 mm by means of metal insert sheets (23, 23').

The distance a, ie. from the upper edge to the lower edge of the lower slot, is about 0.5 mm b, ie. from the lower edge of the coater to the material web, is from 0.1 to 5 mm c, ie. between the upper edge of the upper slot and the lower edge of the lower slot, is from 1 to 2.2 mm.

The upper front surface (21) and the lower front surface (22) of the coater is such that, when the coater is swivelled forward during coating, the coater is a sufficient distance away from the material web.

The edge (5) of the magnet (2) is present roughly in the geometric center of the coating gap (3). To optimize the coating conditions, the magnet can be adjustably displaced from 0.5 to 1 mm upward or downward. As in the case of the known extrusion coater, it is also possible to displace the coater in the horizontal direction so that the distance from the substrate to the coater outlet gap can be made smaller or larger.

It has also been found that the substrate web (1) preferably runs out at an acute angle α to the upper edge (5) of the magnet (2), this angle being from 0.5° to 5°, preferably 1° (FIG. 3).

In an advantageous embodiment, an edge bead on both sides which inevitably forms during coating is reliably avoided by mounting a stripping plate (13) (FIG. 1) at both coating edges according to DE-A 42 26 138 of the same Applicant, which stripping plate is essentially perpendicular to the extruder slots, the outflowing coating dispersion flowing away along the inner surface of the stripping plate, and the stripping plate being extended by a certain amount beyond the lower or upper extruder lip toward the material web.

The advantage of the novel extrusion coater is illustrated below using a double-layer coating on an audio tape as an example.

1. Lower layer

A magnetic dispersion having the composition below was prepared (all data are parts by weight).

539 parts of tetrahydrofuran, 231 parts of cyclohexanone, 329 parts of polyesterpolyurethane, 12 parts of zinc stearate, 20 parts of diaminopropane dioleate, 4 parts of stearamide, 3 parts of Polysynlan, 24 parts of nonmagnetic $Fe_2O_3$, particle size 0.7 μm, and 800 parts of acicular magnetic chromium dioxide, BET value 25 $m^2$/g, $H_c$=37 kA/m, were stirred for 2 hours in a disperser at 1000 rpm, 194 parts of polyvinyl formal were then added and dispersing was continued for a further hour. 470 parts of polyesterpolyurethane were then admixed separately. This composition predispersed in this manner was finely milled for several hours in a ball mill which was 70% filled with ceramic balls measuring from 1 to 1.6 mm. The viscosity was 2500 mPa·s, measured using a Brookfield viscometer at 20° C.

2. Upper layer 915 parts of tetrahydrofuran, 392 parts: of cyclohexanone, 191 parts of polyesterpolyurethane, 12 parts of zinc stearate, 10 parts of diaminopropane dioleate, 1.6 parts of stearamide, 0.8 parts of silicone oil, 3.2 parts of Polysynlan, 24 parts of nonmagnetic spherical $Fe_2O_3$, particle size 0.7 μm, and 800 parts of acicular magnetic chromium dioxide, BET value 32 $m^2$/g, $H_c$=48.7 kA/m, were dispersed for 2 hours in a disperser at 1000 rpm, 169 parts of polyvinyl formal were then added and dispersing was continued for a further hour. 422 parts of polyesterpolyurethane were then admixed. This composition was then introduced into a ball mill, which was 70% filled with ceramic balls measuring from 1 to 1.6 mm, and was finely dispersed for several hours. The viscosity of the dispersion thus prepared was 1550 mPa·s.

A 50% strength solution of a diisocyanate crosslinking agent known from the prior art was metered into the two dispersions thus prepared, immediately before the coating procedure, metering being effected in an amount such that there was in each case 0.5 part by weight of crosslinking agent per 100 parts by weight of dispersion. The dispersions were pumped from two storage containers, after fine filtration with the aid of filter tubes, through the two coating slots (8') (lower layer) and (8) (upper layer) through a novel double-slot coater according to FIG. 2 to the coating gap, the slot widths being 0.3 mm (lower coating gap) and 0.3 mm (upper coating gap). The angle δ between the two coating slots was 15°.

A 6.8 μm thick polyethylene terephthalate substrate was moved past at a speed of 100 m/min and at a distance of 1 mm from the lower coating orifice. The dispersion from the lower slot was first applied alone so that, after drying, a dry layer thickness of 3.2 μm was obtained, after which the upper layer was applied separately from the upper coating gap onto the substrate so that, after drying, a layer thickness of 2.7 μm was obtained. The two layers were then applied one on top of the other, oriented longitudinally in a magnetic field in the running direction, dried, drawn through four calender nips having a nip pressure of 280 kp/cm at a calender roll temperature of 95° C. and then slit longitudinally to a width of 3.81 mm.

The magnet arranged opposite the coating orifice had a field gradient of about 500 A/cm at the edge in the direction toward the extruder slot, and the field strength of the magnet in the running direction of the coated substrate was 320 A/cm.

The double-layer audio tape thus produced had the following mechanical and magnetic properties:

|  | Thickness | $H_c$ kA/m | Br/Bs | Orientation ratio | SFD | Gloss |
| --- | --- | --- | --- | --- | --- | --- |
| Lower layer | 3.2 | 37.5 | 0.84 | 3.18 | 0.40 | 141 |
| Upper layer | 2.7 | 50.4 | 0.83 | 3.10 | 0.34 | 98 |
| Double layer | 5.9 | 42.6 | 0.84 | 3.12 | 0.67 | 121 |

The orientation ratio $R_f$ is the ratio of the residual magnetization in the playing direction to that in the crosswise direction. The SFD (switching field distribution) indicates the distribution of the coercive forces.

The coefficients of friction, the abrasion values, the running behavior in the cassette and the electroacoustic properties were satisfactory.

We claim:

1. An extrusion coater having at least two coating slots for applying one or more magnetizable layers, one on top of the other, on a flexible nonmagnetic substrate, with which the extrusion coater forms a cooperative combination, a common outlet orifice of the at least two coating slots including an upper and lower lip, the upper lip being recessed relative to the lower lip, and a right parallelepiped magnet which is essentially parallel to the substrate and whose upper edge is opposite and a distance away from the common outlet orifice is arranged behind the substrate, wherein a central line between the at least two coating slots is arranged perpendicular to a plane of the substrate and an outlet-end terminating edge of a separator between the at least two coating slots is a single inclined surface falling off at an angle of from 10° to 60° to the plane of the substrate in the direction of the lower lip.

2. An extrusion coater as claimed in claim 1, wherein the outlet-end terminating edge of the separator between the at least two coating slots is a single inclined surface (15) which has a length of about 0.3–5 mm.

3. An extrusion coater as claimed in claim 1, wherein an angle δ between the at least two coating slots is from about 10° to 45°.

4. An extrusion coater as claimed in claim 1, wherein the substrate runs out at an angle α to the upper edge of the right parallelepiped magnet, with the angle α being from 0.5° to 5°.

5. An extrusion coater as claimed in claim 1, wherein at least the upper edges of the at least two coating slots are in the form of a surface having a length of about 50 μm.

6. An extrusion coater as claimed in claim 1, wherein the width of the at least two coating slots is variable by means of metal insert sheets.

7. An extrusion coater having at least two coating slots for applying one or more magnetizable layers, one on top of the other, on a flexible nonmagnetic substrate, with which the extrusion coater forms a cooperative combination, a common outlet orifice of the at least two coating slots including an upper and lower lip, the upper lip being recessed relative to the lower lip, and a right parallelepiped magnet which is essentially parallel to the substrate and whose upper edge is opposite and a distance away from the common outlet orifice is arranged behind the substrate, wherein the at least two coating slots each have an outlet end and include an upper coating slot, the at least two coating slots point upward at the outlet end in such a way that an angle ε between the perpendicular to a plane of the substrate and the upper coating slot is at least 5° and an outlet-end terminating edge of a separator between the at least two coating slots is a single inclined surface falling off at an angle of from 10° to 60° to the plane of the substrate in the direction of the lower lip.

* * * * *